March 27, 1973     A. JOHNS ET AL     3,723,268
ELECTROCHEMICAL MACHINING
Filed Dec. 20, 1968     15 Sheets-Sheet 1
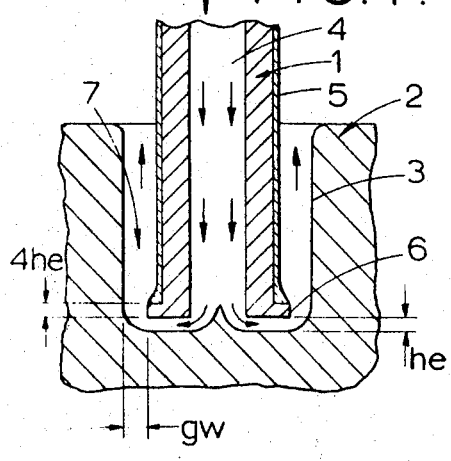
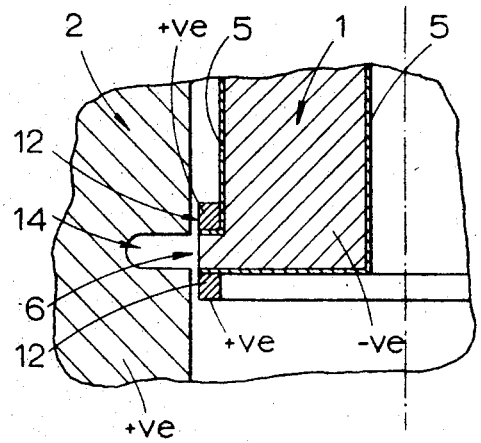
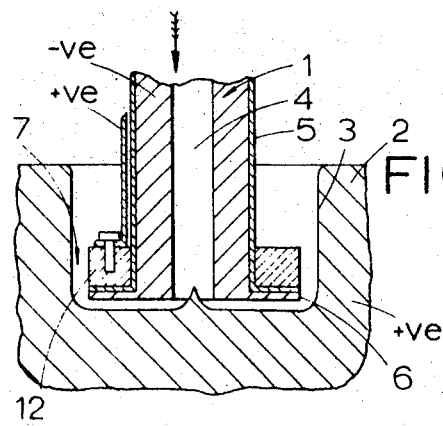
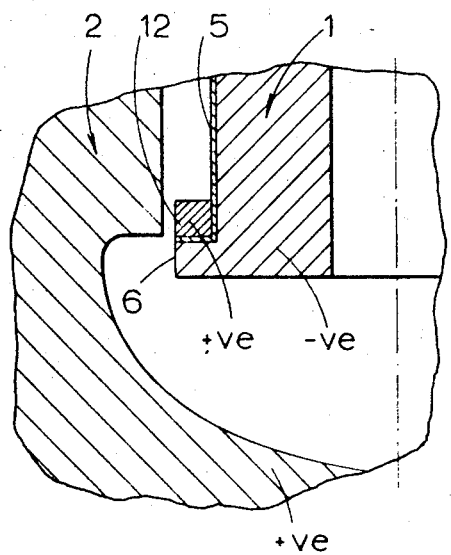
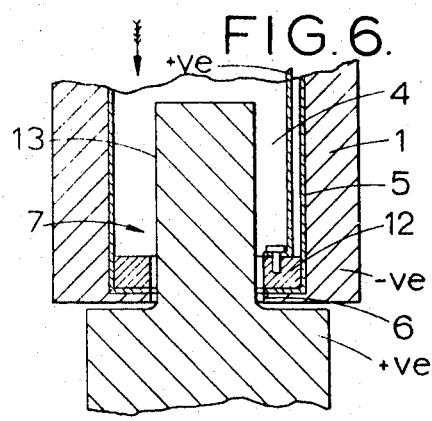

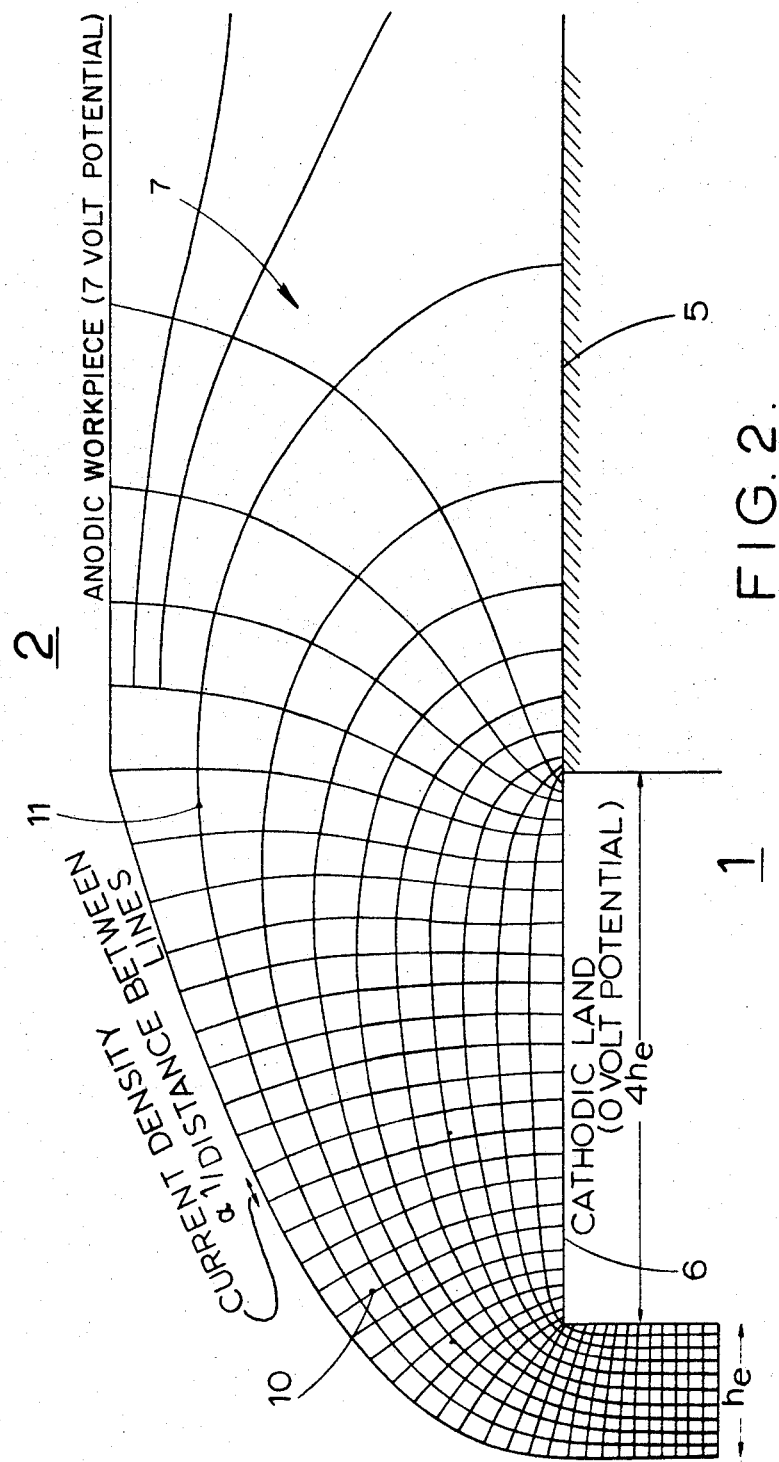

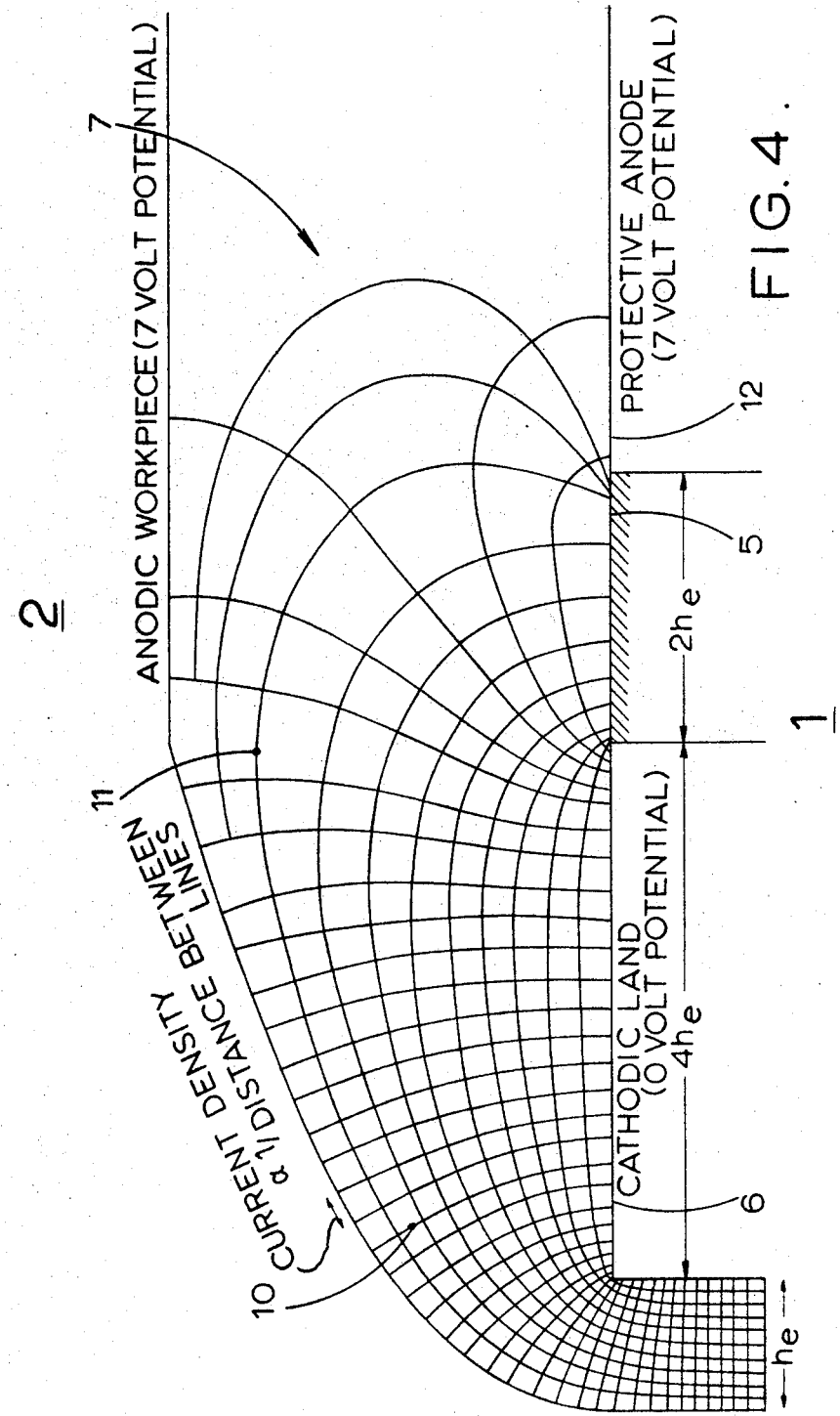

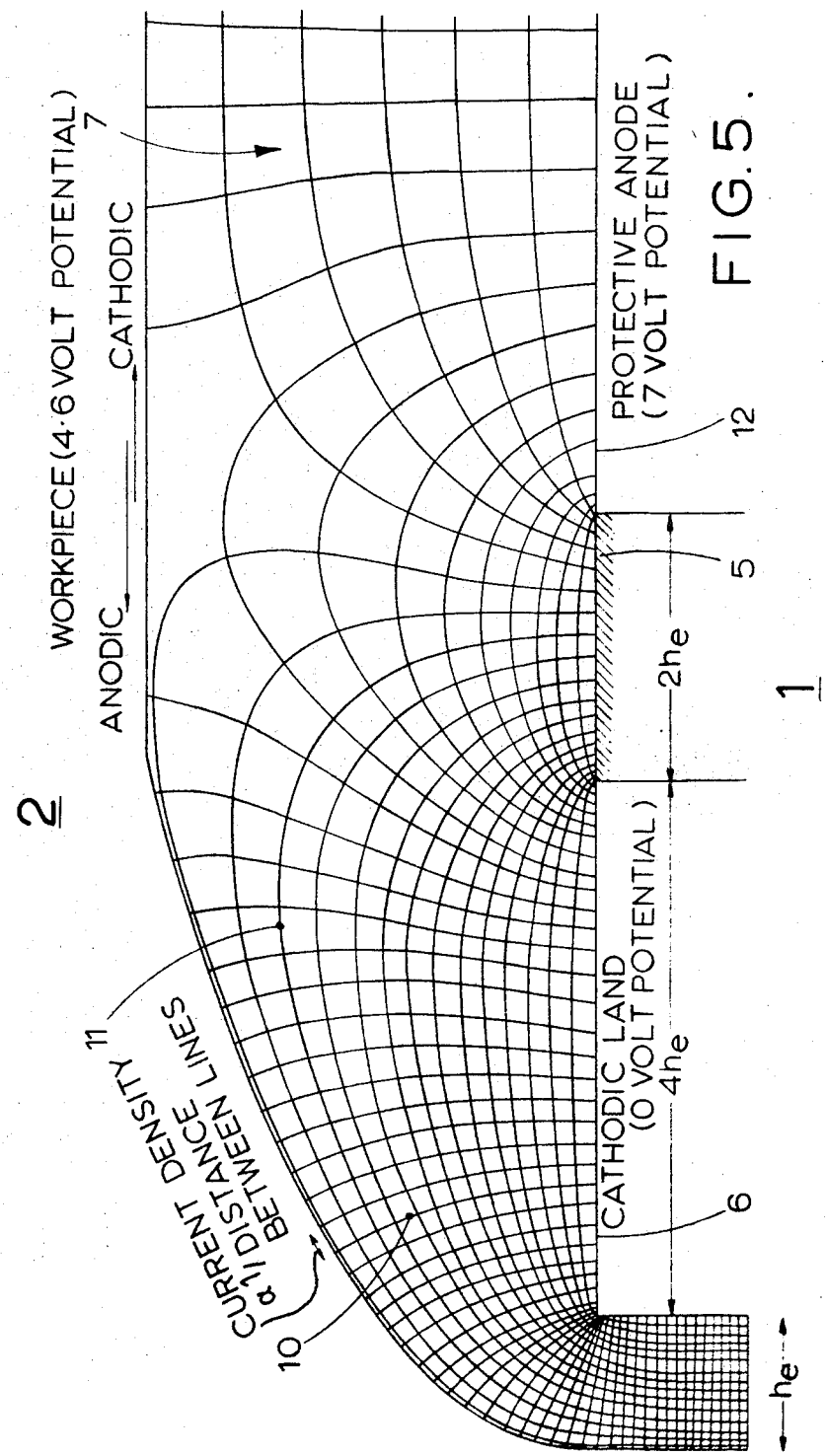

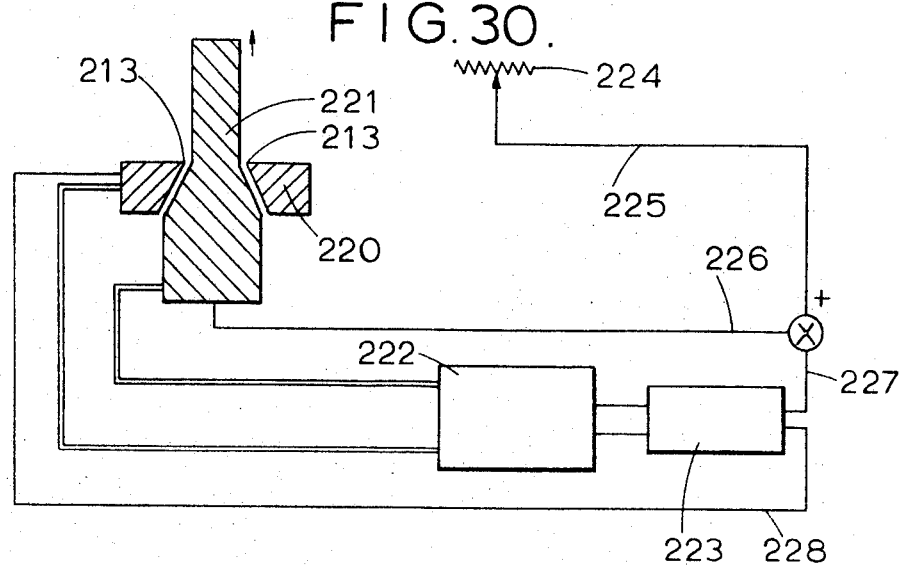
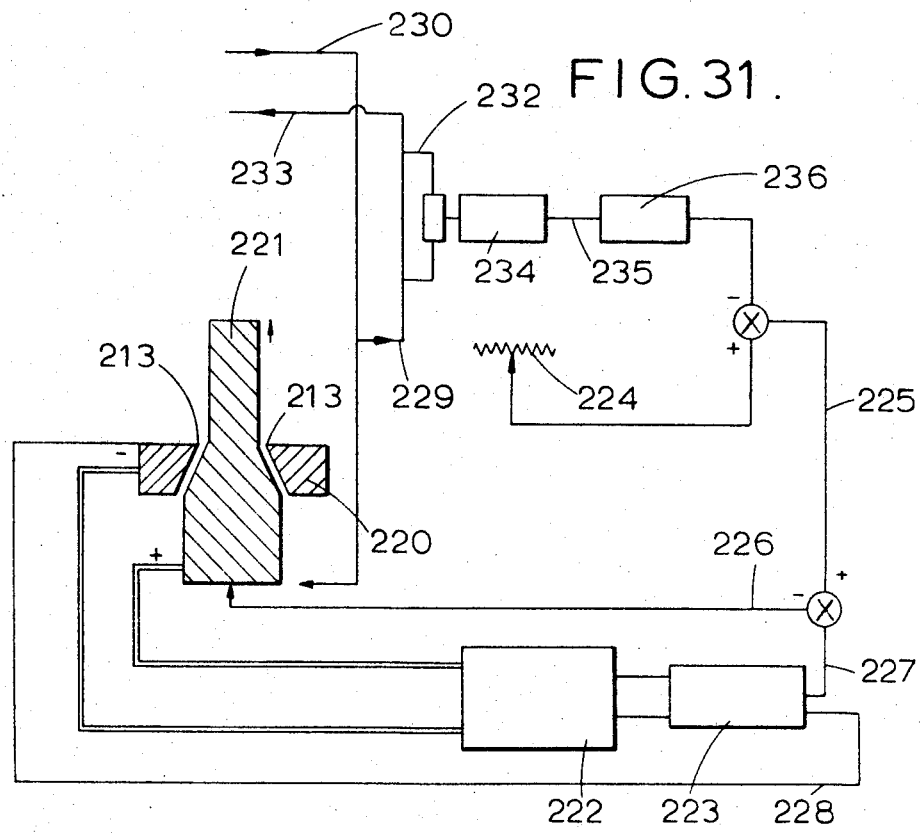

United States Patent Office 3,723,268
Patented Mar. 27, 1973

3,723,268
ELECTROCHEMICAL MACHINING
Antony Johns, Melton, Mowbray, Michael Tiley, Keyworth, and Patrick J. McDonnell, Burton-on-the-Wold, England, assignors to Production Engineering Research Association of Great Britain, Melton, Mowbray, England
Filed Dec. 20, 1968, Ser. No. 785,559
Claims priority, application Great Britain, Dec. 21, 1967, 58,124/67; May 8, 1968, 21,874/68
Int. Cl. B23p 1/00; B23k 9/16
U.S. Cl. 204—129.1
18 Claims

ABSTRACT OF THE DISCLOSURE

Methods of electrochemical machining in which stray machining is inhibited and a high feed rate and a constant working gap can be achieved. Stray machining is inhibited by a protective electrode provided on the cathodic tool and maintained at a positive electrical potential relative to the tool to confine electrical current flow between the tool and an anodic workpiece to regions where erosion is desired. High feed rates are achieved by appropriate tapering of a machining land on the tool. Constant working gaps are achieved by normalizing the machining voltage with the aid of voltage sensing probes, by controlling the conductivity of the electrolyte or by forming stable globules of electrolyte in a dielectric carrier liquid, the globules having a diameter matching the desired gap.

---

This invention relates to improvements in electrochemical machining and in tools for such machining.

Electrochemical machining is a machining process which is applicable to metal removal, where machining is achieved by advancing an electrode and a workpiece relatively towards one another while simultaneously pumping an electrolyte through the machining zone between such electrode tool and workpiece. During such machining a low voltage, high density, direct current is passed between the electrode and the workpiece in such direction that the workpiece is anodic. Workpiece material removal is achieved by the electrochemical reaction or erosion which takes place on the workpiece, and the removed workpiece material is carried away in solution, or as sediment, in the electrolyte.

By forming the cathodic electrode tool suitably, the workpiece may be eroded so as to be machined to a shape corresponding to that of the tool. A typical example of this is in the piercing of a particularly shaped hole, for instance a square hole, into a hard metal workpiece. The tool for such a machining operation would of course be square in cross-section and would be fed into the workpiece as electrochemical machining took place. It will be appreciated that as the tool progresses into the workpiece, the workpiece will be initially eroded so that a square depression is generated, and this depression will deepen into a square hole with the progress of machining.

However electrochemical action will take place to a varying extent between the tool and the workpiece over the whole region between the tool and the workpiece during machining. A consequence of this is that although the initial depression formed during such a machining operation closely corresponds in cross-sectional size to that of the tool, as machining progresses the lower portion of the depression or hole achieved remains in close correspondence with the tool while further electrochemical action takes place between the outer or first formed part of the hole and the tool, resulting in undesired increase in size of the upper part of the hole and sometimes distortion of the desired shape. This further undesired machining which takes place is frequently termed "Stray Machining" and will be referred to by this term hereinafter.

In order to overcome the problem of stray machining, the tools used for electrochemical machining are coated with insulating material so that only a small machining land of the tool surface is left bare to sustain the machining process at the front of the tool as it enters a workpiece, with the result that stray machining is considerably reduced. However it has not proved possible to entirely eliminate stray machining by this means.

It is an object of the present invention to provide a method of electrochemical machining in which stray machining is inhibited.

It is a further object of the present invention to provide a tool for electrochemical machining which inhibits stray machining when in use.

In electrochemical machining, it is necessary to maintain a gap in advance of the tool between the workpiece and the tool, during the machining operation as the tool progresses into the workpiece; otherwise a direct short will take place between the workpiece and the tool resulting in a breakdown of the machining operation.

The maintenance of this gap between the workpiece and the tool has resulted in a limitation of the feed rate which can be achieved in an electrochemical machining operation, and it is therefore an object of the present invention to provide apparatus for and methods of electrochemical machining which enable high feed rates of the tool relative to the workpiece to be utilised.

Further it has been found that it is desirable to maintain the working gap between the tool and the workpiece as constant as possible, and for precise machining operations, such as the generation of a parallel sided hole in a workpiece, the working gap must be very precisely controlled if the desired precision is to be maintained.

It is therefore an object of this present invention to provide a method of controlling an electrochemical machining process which enables the working gap to be maintained constant.

In order to promote a fuller understanding of the invention some embodiments will now be described, by way of example only, with reference to the accompanying drawings, in which:

FIG. 1 is a schematic diagram of a typical known landed electrochemical machining tool in use, FIG. 2 is a diagram showing the current density distribution between electrochemical machining tool of FIG. 1 and a workpiece, FIG. 3 is a schematic diagram of an electrochemical machining tool of the invention, FIG. 4 is a diagram showing the current density distribution between the tool of FIG. 3 and a workpiece, FIG. 5 is a further diagram showing the current density distribution between a tool of FIG. 3 and a workpiece, FIG. 6 is a schematic diagram of a further tool of the invention, FIG. 7 is a schematic diagram of a tool of the invention arranged for the machining of internal grooves, FIG. 8 is a schematic diagram of a tool of the invention arranged for machining of internal undercuts, FIG. 9 is a schematic diagram of a tool of the invention arranged for the machining of a surface, FIG. 10 is a schematic diagram of a further tool of the invention which is particularly applicable to deburring, FIG. 11, is a schematic diagram of a similar tool to that of FIG. 10, FIGS. 12 and 13 show in schematic form a method of machining a sharp edged workpiece with a tool of the invention, FIG. 14 shows in schematic cross-section the machining of a hole in a sheet of metal, FIG. 15 shows an embodiment of the invention for machining a hole in a similar circumstance to FIG. 14, FIG. 16 shows a further arrangement of the embodiment of FIG. 15, FIG. 17 shows yet a further arrangement of the embodiment of FIG. 15, FIG. 18 shows a graph of feed rate against electrolyte path length, FIG. 19 shows a schematic cross-sectional view of an embodiment of the invention, FIG. 20 shows a graph of feed rate against taper angle for the tool of FIG. 19, FIG. 21 is a modified embodimnt of the invention, FIG. 22 is a graph of over-cut against taper angle for the tool of FIG. 19 or 21, FIGS. 22A and 23B to 27A and 27B inclusive respectively show stages in manufacture of typical tools embodying the invention, FIG. 28 shows a further embodiment of the invention, FIG. 29 shows an arrangement similar to that of FIG. 1 only with an unlanded tool, FIG. 30 is a schematic diagram of the machining voltage control system of an embodiment of the invention, FIG. 31 is a schematic diagram of the voltage control system of FIG. 30 including means for measuring the conductivity of the electrolyte, FIG. 32 is a general schematic diagram of a die sinking operation illustrating the problem which arises with conventional electrochemical machining techniques, FIG. 33 is a schematic diagram of a electrochemical die sinking operation in accordance with one embodiment of the invention, FIG. 34 is a schematic diagram of the electrolyte circulation system suitable for use with the machining method of FIG. 33, and FIG. 35 is an alternative circulation for the electrolyte for the method of FIG. 33.

FIG. 1 shows a known electrochemical machining tool 1 being fed into a workpiece 2 in order to machine a hole 3 therein. In this particular example, the hole 3 to be machined is round in cross-section and consequently the tool 1 is also round, although it will be appreciated that the hole 3 may equally be square or of any other suitable shaped cross-section. The workpiece is connected to the positive terminal of a high current capacity D.C. voltage supply and is therefore anodic, while the tool is connected to the negative terminal of that supply and is therefore cathodic. The electrolyte used in the machining process is pumped through a bore 4 in the centre of the tool 1 and escapes around the tool 1 through the hole 3 as it is produced. Electrochemical erosin, that is to say electrochemical machining takes place between the tool 1 and the workpiece 2 wherever a current flows through the electrolyte between the tool 1 and the workpiece 2, and takes place at any particular point on the workpiece at a rate which is to a great extent, proporional to the current density at that point.

The tool is provided with an insulating coating 5 around its outer surface, which extends down so as to leave a narrow land 6 to sustain the machining operation. Consequently the tendency is for electrochemical machining to take place only adjacent the machining land 6, and only to occur to a very slight extent in the upper region 7 of the hole 3 as machining progresses, although stray machining does take place in this region resulting in the production of a slight taper in the lower part of the hole, loss of accuracy and surface finish.

FIG. 2 shows in graphical form established from analogous experiments, the current density between a tool and workpiece such as those shown at 1 and 2 in FIG. 1. The graph takes no account of the threshold potentials at either the workpiece or the tool, below which no electrochemical current will flow, but these discrepancies are small and are not significant in the present discussion and would in any case assist in the inhibitation of stray machining. In FIG. 2, the tool 1 is shown at earth or negative potential while the workpiece is shown at a potential of plus 7 volts relative to the tool. The tool 1 is shown with an effective machining land 6 equals to 4 times the equilibrium gap "$h_e$" between the front of the tool land workpiece 2 under these particular machining conditions shown.

The current density, which in FIG. 2 is substantially inversely proportional to the square of the distance between the current flow lines 10 which are plotted between the tool and workpiece, is greatest at the front of the tool and reduces toward the back of the land 6 and then rapidly reduces towards and into the region 7 adjacent to the insulating coating 5. The lines 11 in FIG. 2 are plotted along those points between the tool 1 and the workpiece 2 where the voltage is constant and therefore are lines of equal potential.

It can be seen from FIG. 2 that stray machining, although to a reduced extent, will take place in the region 7 on a scale which reduces progressively with the distance from the land 6 even with the provision of the insulating coating 5.

FIG. 3 shows an electrochemical machining tool of an embodiment of the invention and those parts which correspond in purpose to the tool shown in FIG. 1 are given like reference numerals. FIGS. 4 and 5 show, in a similar manner to FIG. 2, the current density distribution between the tool and workpiece of FIG. 3 under two different machining voltage configurations respectively, and again like features are given the same reference numerals as in FIG. 2.

The tool 1 of FIG. 3 is generally similar to that of FIG. 1 with a narrow machining land 6 and an insulating coating 5 extending down to that land. However the tool of FIG. 3 has a further conducting land 12 adjacent the land 6 but electrically insulated from it. This further conducting land 12 is also connected in operation to the positive terminal of the D.C. supply and is consequently anodic, and is hereinafter referred to as a protective anode.

FIG. 4 shows the current density distribution between the tool of FIG. 3 and the workpiece in which the protective anode 12 is separated, by an insulating band of a thickness twice the equalibirum gap "$h_e$," from the machining land 6. It can be seen that the current density distribution around the front of the tool is generally similar to that shown in FIG. 2 for the tool of FIG. 1. However the current density distribution towards and in the region 7 between the tool 1 and the workpiece 2 is considerably modified. In the machining arrangement of FIG. 4, the machining land 6 is at zero or negative potential while the workpiece is at a positive potential of 7 volts and the protective anode is also at a positive potential of 7 volts. It can be seen from FIG. 4 that the unwanted current flow between the machining land 6 and the workpiece 2 in the region 7 is considerably inhibited by the presence of the protective anode 12 which, being of positive potential, attracts the current flow in this region to it rather than the workpiece 2.

Thus with this arrangement stray machining is to a great extent inhibited, taking place only in that part of the region 7 which is immediately adjacent the machining land 6 of the tool.

FIG. 5 shows a similar arrangement to FIG. 4 with the exception that the machining land 6 is at zero or negative potential, the protective anode is at plus 7 volts potential relative to the land 6, while the workpiece is at plus 4.6 volts potential relative to the land 6.

It can be seen that by this arrangement, that is to say where the protective anode is at a higher potential than the anodic workpiece, the current distribution is further advantageously modified.

With this arrangement the current density between the land 6 and the protective anode 12 is considerably greater than that of FIG. 4, with a resultant slight reduction in machining efficiency, but it can be seen that the intrusion of current flow between the machining land 6 and the workpiece 2 into the region 7 is substantially eliminated. Instead current flow takes place from the workpiece tool to the protective anode 12 through the region 7, because the workpiece tool is in fact cathodic, relative to the protective anode, in that region.

Therefore by the provision of the protective anode, and the suitable choice of potential applied to the machining land, the workpiece and the protective anode, so as to control the extent and shape of the electric field in the electrolyte between the tool and the workpiece, it is possible to confine the current flow between the tool and the workpiece substantially only to those regions where it is desired to erode the workpiece and consequently to inhibit stray machining. It will be appreciated that where the protective anode is at a higher potential than the workpiece, the tendency would be for the protective anode to be eroded of electrochemically machined by the workpiece which would, in this instance, be acting in the nature of a tool. It is therefore desirable that the material of the protective anode is suitably chosen so that it is non-consumable, and it has been found that the most suitable materials are precious metals such as platinum, palladium and gold; graphite of various grades both with and without resin bonding; and synthetic plastics materials which are made conducting by the inclusion in their composition of conducting material.

It will be appreciated that the provision of protective anodes of precious metals on large tools can result in heavy costs which may make the tool uneconomic. In such instances the protective anode may be made of steel, copper, brass or other conducting material but will be consumable, being in effect electrochemically machined either by the tool itself as in FIG. 4 or by the tool and the workpiece as in FIG. 5, and consequently will need periodic replacement.

While the above description with reference to the tool shown in FIG. 3 has referred to internal machining, it will be seen that the invention is equally applicable to external machining for producing an externally shaped part. FIG. 6 shows an embodiment of the invention which is suitable for such external machining and those parts which correspond to those of FIG. 3 are given the same reference numeral. The hole 3 produced in FIG. 1 is replaced by the external surface 13 in FIG. 6, otherwise the arrangement and mode of operation is essentially similar.

FIG. 7 shows an embodiment of the invention which is suitable for machining a groove 14 within a bore, with those parts which correspond to those of FIG. 3 given the same reference numerals; while FIG. 8 shows a similar embodiment for machining an internal under-cut within a bore.

Figure 9:
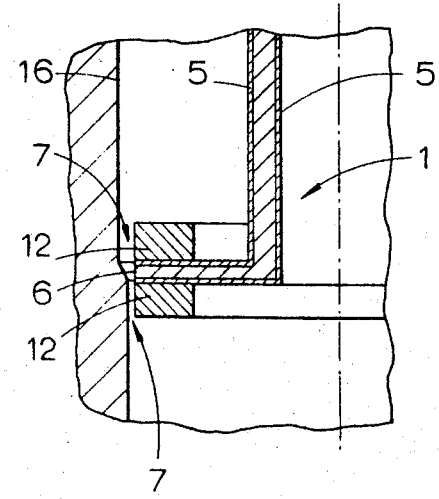
FIG. 9 shows an embodiment of the invention which is suitable for machining or finishing the surface 16 of a bore in a workpiece, and those parts which correspond to those of FIG. 3 are again given the same reference numbers.

It is often desirable to utilise an electrochemical machining process for a finish machining operation, such as a finishing machining of a circular or other shaped bore already produced through a workpiece. Such a finishing operation may be required after previous non-electrochemical machining processes, or may be required to improve the accuracy of a previous electrochemical machining operation. In such an instance, it can be seen that stray machining would take place in front of the machining land 6 of a tool such as that shown in FIG. 9 as well as behind the machining land 6 in the area indicated at 7. Such stray machining would erode away the machining allowance in the bore before the machining land 6 approached and can be inhibited in front of the machining land 6 by the provision of a further protective anode in a similar manner to that shown at 12 in FIG. 3. Unless such stray machining is inhibited, particularly in the finishing of deep bores, not only will the allowance made for the finish machining operation be prematurely eroded away in front of the tool, but the surface will be damaged to a depth such that the finished machining operation proper will no longer correct it.

Figure 10:
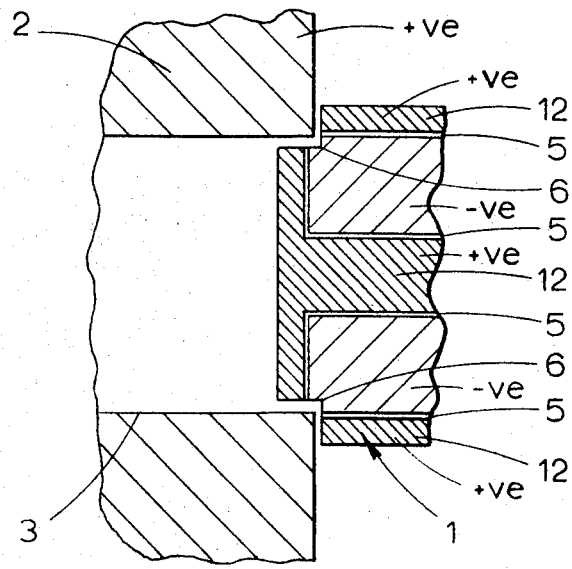
Figure 11:
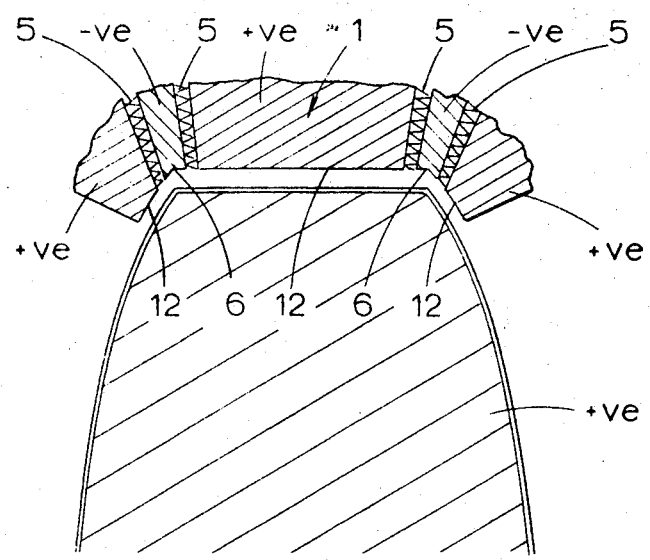

FIGS. 10 and 11 show further arrangements of tools according to the invention which are particularly applicable to deburring operations and where parts correspond to those in FIG. 3 they are given the same reference numerals.

FIG. 10 shows a tool 1 arranged to deburr the end of a bore 3 in a workpiece 2. The machining land 6 for this operation is protected on either side by a protective anode 12 insulated from the machining land 6 by insulating layers 5. With this arrangement, it can be seen that the electrochemical action will be limited to the area immediately around the rim of the bore 3 and that the bore 3 itself and the surface of the workpiece 2 will be protected from stray machining. Electrolyte flow in this arrangement can be provided as necessary, for instance through the bore 3 itself, or alternatively the operation may take place in a static electrolyte bath.

FIG. 11 shows a further development of the tool of FIG. 10, as applied to the deburring of a gear tooth workpiece 2. Again it can be seen that the machining lands 6 are provided with protective anodes 12 on either side which restrict the electrochemical action of the area immediately adjacent to the machining lands 6, that is to say the edges of the gear tooth where the flank profile meets tip diameter and where deburring is invariably necessary.

Figure 12:
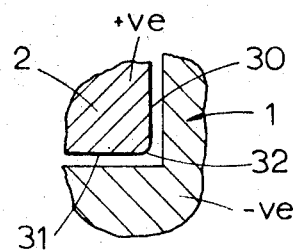
Figure 13:
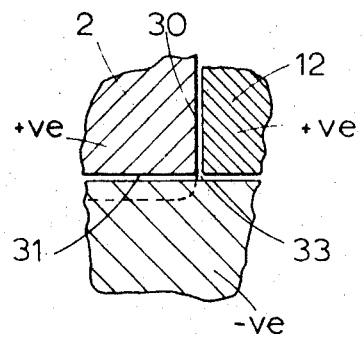

FIGS. 12 and 13 show in schematic form the two steps by which a tool of the invention may be used to machine an external sharp edge on a workpiece. Again similar parts to those of FIG. 3 are given the same reference numerals.

The first stage of the operation as shown in FIG. 12 is to externally machine a workpiece 2 with an electrochemical tool 1 of conventional design which produces two flat faces 30 and 31 having a radiused corner 32 joining them.

The next stage of the operation is as shown in FIG. 13 to further machine the face 31 with a tool which includes a protective anode 12. It can be seen that by this means the electrochemical action may be restricted entirely to the face 31 and consequently it is possible to remove the face 31 to such a depth the radius 32 is eliminated to result in a sharp corner 33.

Figure 14:
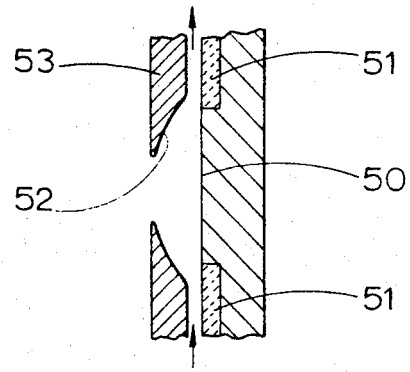

Another application of the invention is shown in FIG. 14 which depicts the machining of a hole in sheet material by a conventional electrochemical machining process, using a cathodic tool having a machining land 50 surrounded by an insulating layer 51, for machining a hole 52 in a sheet metal workpiece 53. As shown in FIG. 14, such a machining method results in a grossely tapered hole due to stray machining taking place beyond the region of the land 50 and the complex machining conditions resulting from the stationary arrangement of the tool.

Figure 15:
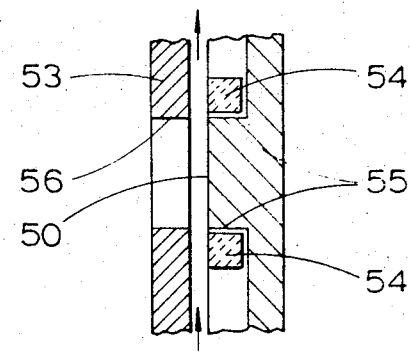

FIG. 15 shows an embodiment of the invention in which the land 50 is surrounded by a protective anode 54 which is insulated from the land 50 by an insulating layer 55. The provision of such a protective anode inhibits stray machining by controlling the shape of the electric field produced between the workpiece and the land 50 and this results in the machining of an accurate and square hole as indicated at 56.

It will be appreciated that in either arrangement the electrolyte is pumped through the space between the tool and the workpiece.

Figure 17:
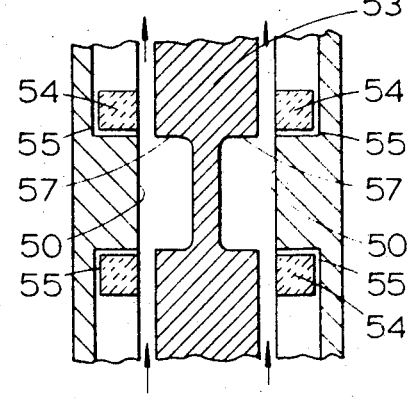

FIG. 17 shows a further arrangement of the embodiment of FIG. 15 in which a tool is provided on either side of the sheet metal workpiece 53 to machine a hole, as indicated at 57, from either side simultaneously. Such an arrangement is particularly suitable for thicker sheet workpieces, as it can be seen that the machining of the workpiece always takes place adjacent the land 50 and within the area of control of the protective anode 54, as opposed to the arrangement where only one tool is used in which case, as the hole get progressively deeper, the machining takes place further from the land 50 and further from area of control of the protective anode resulting in the growth of stray machining the deep the hole becomes.

Figure 16:
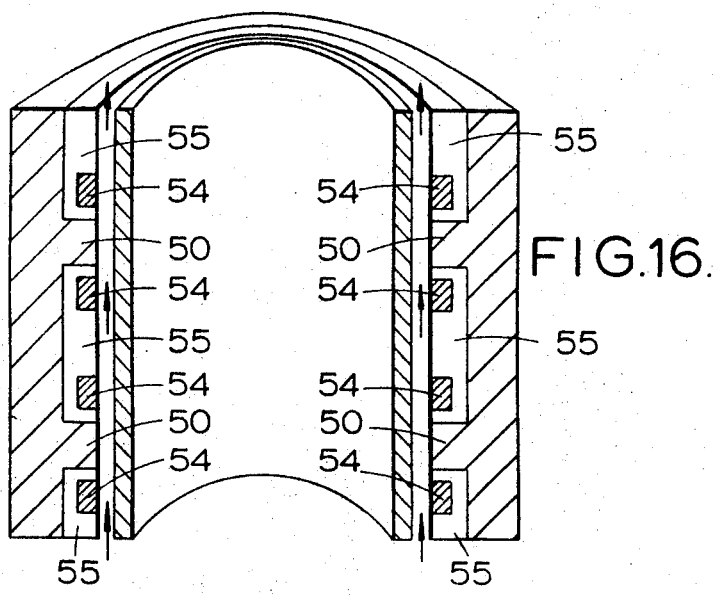

FIG. 16 shows a composite arrangement of a plurality of machining lands 50 similar to that shown in FIG. 16 utilised to machine a plurality of holes in a thin cylindrical workpiece indicated at 60. Other parts corresponding to those in FIG. 5 are given the same reference numbers and no further description is necessary.

Thus it can be seen that this invention provides a further arrangement for the electrochemical machining method and apparatus with protective anodes, which are suitable for use without relative movement between the tool and workpiece and which enables the undesired stray machining to be controlled.

It will be understood that holes of irregular shape may be machined in this manner, and any desired number of holes may be machined in one operation.

In general electrochemical machining processes are frequently lengthy and this results in noticeable erosion of workpieces in areas quite remote from the actual machining area, and to such items as workpiece fixtures, tool fixtures and other components within the electrolyte area. Such random erosion can be troublesome and may be prevented by the provision of a protective anode between the cathodic tool and any such area within the electrolyte.

Thus it can be seen that the invention provides a method of electrochemical machining and an electrochemical machining tool, each of which inhibits undesired stray machining. Use of methods or the tool of the invention result in improvement in machining accuracy and the prevention of unwanted corrosion in areas remote from the machining area. This further results in an improvement in surface finish. The reason for this last is that electrochemical machining occurring at a low current density is selective in its attack on the workpiece. This is caused by the creation, within the surface of the workpiece, of a series of subsidiary electrochemical processes between the different phases and inclusions in the workpiece parent material and between the grain boundaries within the material, resulting in localised electrochemical action in small areas with consequent pitting of the electrochemically machined surface and the formation of small fissures in that surface. Such pitting and fissures are detrimental to the finish machined product not only from the point of view of poor surface finish, but also from the low fatigue qualities of the surface. Such localised electrochemical action does not occur, to any significant extent, at high machining current densities and a high surface finish is then achievable. It can be seen that the tools and method of the invention, by inhibiting stray machining and other low current density machining and by restricting the machining action to the high current density areas desired, will improve the surface finish achievable.

A further advantage of tools according to the above embodiments of the invention is that the protective anode protects the insulating coating around the tool from erosion by the flow of electrolyte through the machining area for instance in small or narrow holes. This results in considerably longer tool life.

During a machining operation such as shown in FIG. 1, there is as discussed necessarily a gap between the leading face of the machining land of the tool 1 as indicated at $h_e$ in FIG. 1.

Under equilibrium conditions the dimension of the gap $h_e$ is determined by the relationship;

$h_e$ = (Chemical equivalent of workpiece material × voltage × conductivity of electrolyte) ÷ (Faradays constant × density of workpiece × linear feed rate)

Thus it can be seen that by specifying a sufficiently small equilibrium gap $h_e$, the feed rate could be as high as required. However increasing the feed rate and consequently the material erosion or removal rate, results in a higher rate of production of the waste products of the electrochemical reaction between the tool and the workpiece. These waste products include the material removed from the workpiece in solution and hydrogen gas generated in the electrochemical reaction. Since higher feed rate is seen to produce a smaller equilibrium gap, it can also be seen that it will result in reduced quantity of electrolyte present in the actual machining area and also a reduction in the electrolyte flow through the machining area for a given electrolyte feed supply pressure. Consequently the proportion of hydrogen and erosion products in the electrolyte in the machining area will increase radially with feed rate.

It has been found that there is a correlation between the maximum feed rate obtainable and the presence of 40% volumetric concentration of hydrogen gas in the machining equilibrium gap on the exhaust side, if a breakdown of the electrolyte between the tool and the workpiece is to be avoided.

Figure 18:
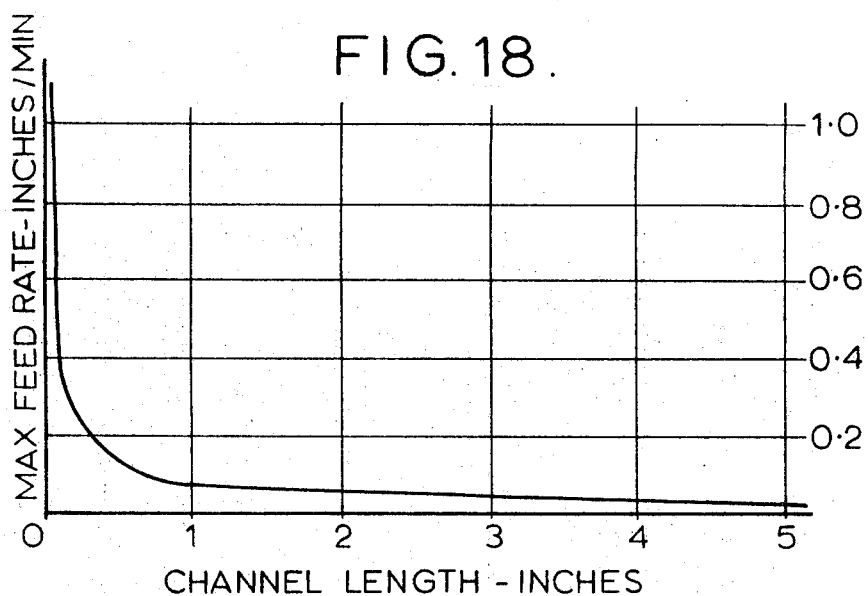

FIG. 18 shows graphically the relationship between the maximum feed rate obtainable and the channel length, that is to say the length of the path of the electrolyte across the machining area, based on the criterion of a 40% volumetric concentration of hydrogen gas in the electrolyte in the machining area, which has been found in practice in a typical conventional set up of electrochemical machining.

Figure 19:
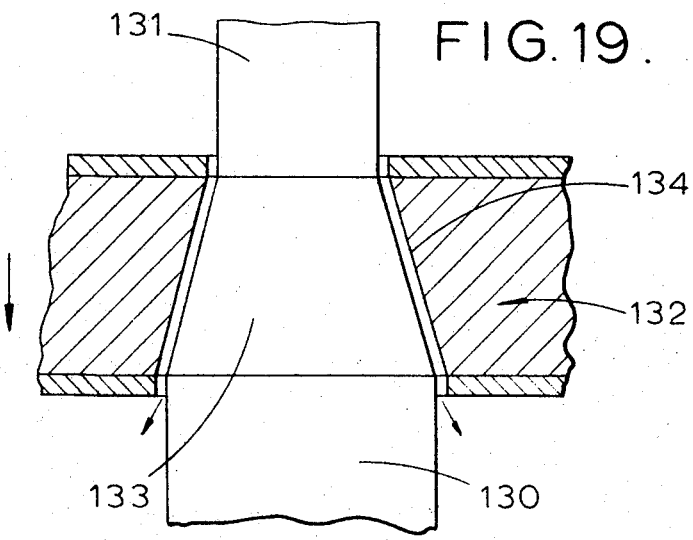

FIG. 19 shows one embodiment of the invention which enables a high rate of feed to be utilised. In this embodiment the workpiece 130 is in the form of a bar of an initial diameter which is reduced to a smaller diameter indicated at 131 by electrochemical machining with an external cathodic tool 132. Instead of the tool 132 machining the bar 130 down ot the diameter 131 in one step, that is to say at a shoulder as has been previously done, the tool 132 has a tapered machining land 134 and machines the bar 130 over a tapered portion 133 as it progresses downwards over the workpiece, as seen in FIG. 19, during machining.

Figure 20:
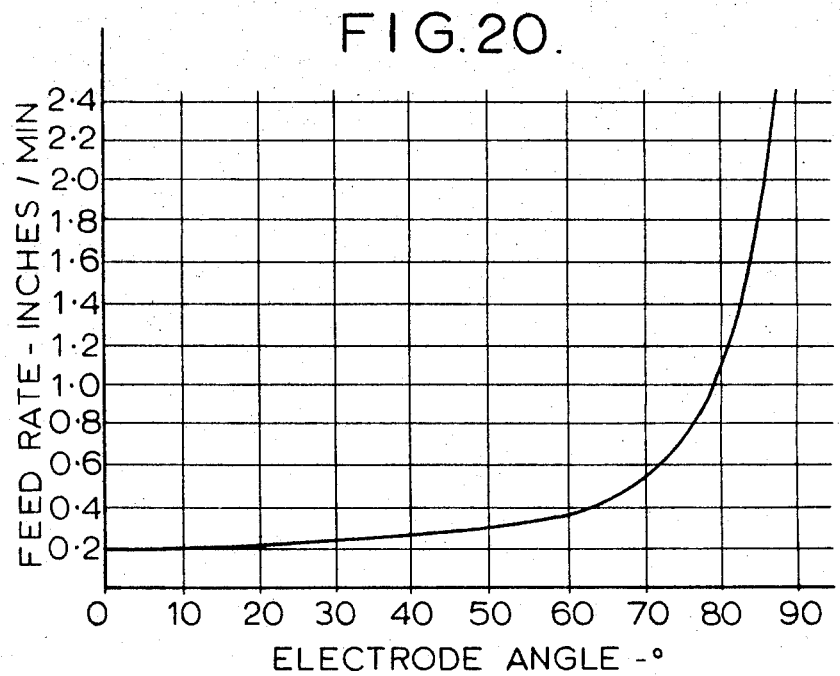

Thus it can be seen that machining takes place over the whole area of the tapered portion 33 which is considerably larger than the area of the machining operation which would exist over the shoulder between the original diameter of the workpiece 130 and the reduced diameter 131. Again insulation is provided on either side of the tool land 134 to confine the machining operation largely to the area 133 of the workpiece. To enable faster machining and while still maintaining the same gap width between electrode and workpiece so that electrolyte flow is not affected, the angle of taper is increased so that the tapered portion of the workpiece actually machined becomes nearer to parallel. A typical relationship between feed rate, gap width and angle of taper is given in FIG. 20.

Figure 21:
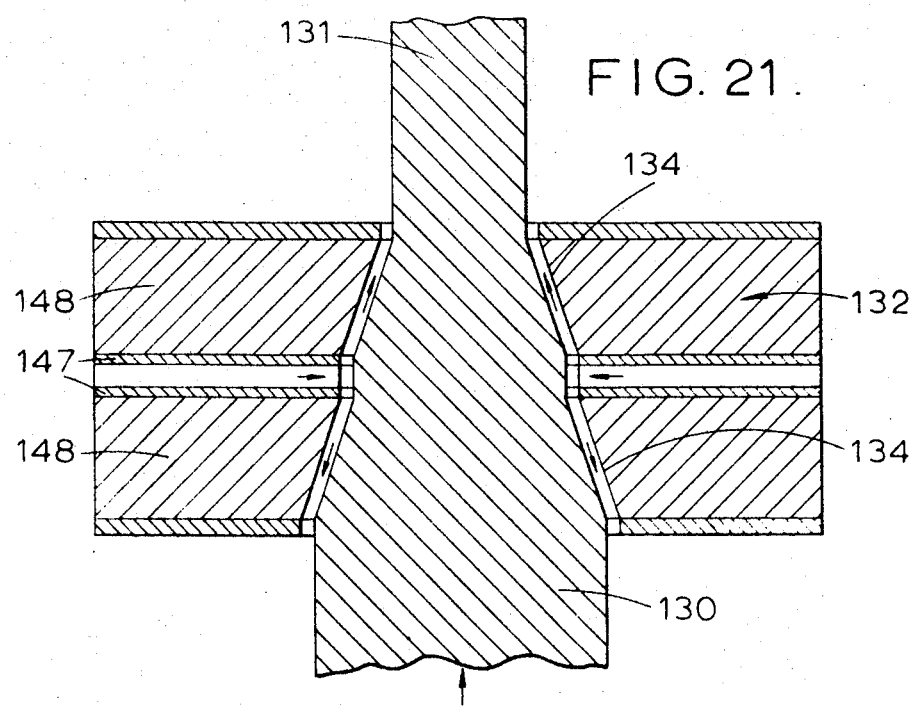
Figure 23A:
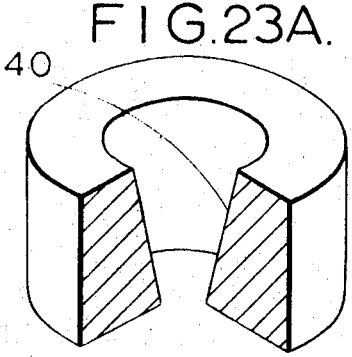
Figure 23B:
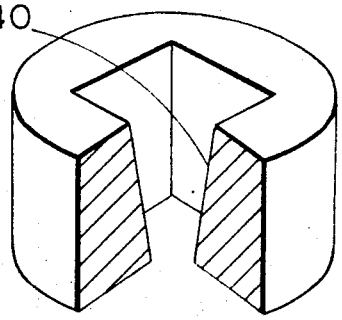

The limitation imposed on feed rate by compositional changes in the electrolyte due to the products of erosion and the hydrogen generated can be overcome by removing the electrolyte loaded with waste products from the machining zone while it is still in condition to function correctly and replacing it with fresh clean electrolyte which itself is replaced further along the electrode. With the electrode land correctly split into regions each with an adequate delivery of clean electrolyte there is then no limitation on feed rate caused by waste products. Such an electrode is shown schematically in FIG. 21 where electrolyte is supplied to the centre of the taper portion and flushes out the machining gap in both directions.

In generating workpieces of a given shape the electrode must be manufactured to accommodate for the radial or side overcutting which occurs as the tool progresses through the workpiece. For tapered electrodes this overcut $g_w$ is given by the formula:

$$g_w = 1.7 \, h_e \cos \theta \text{ for } \theta \text{ between } 0° \text{ and } 45°$$

and $$g_w = h_e \left( \frac{1.7^2}{4} \frac{\cos^2 \theta}{\sin \theta} + \sin \theta \right) \text{ for } \theta \text{ between } 45° \text{ and } 90°$$

where $\theta$ is the taper angle.

Figure 22:
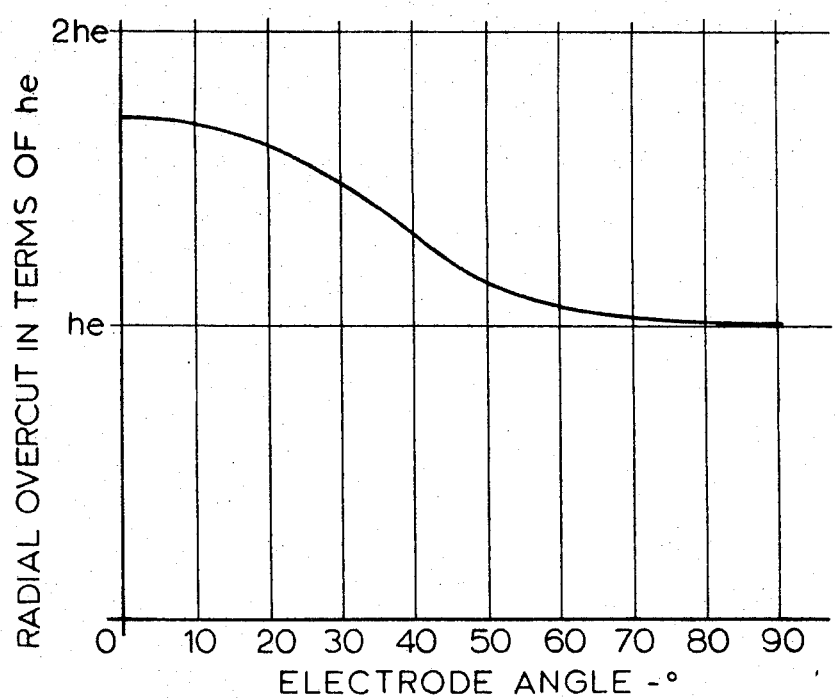

The relationship between $\theta$ and $g_w$ is plotted in FIG. 22.

For the conventional landed electrode the radial or side overcut is the value of the overcut at the corner of the tool plus the amount of overcutting that occurs opposite the side of the land of the electrode (see FIG. 1). The overcut at the corner of the tool as seen in FIG. 1, equals $1.7 \times h_e$ and this represents the absolute minimum overcut possible for an infinitely narrow side land. Reference to FIG. 22 shows that for the same working gap between electrode and workpiece, the overcut for the tapered electrodes of the invention is always less than for an infinitely narrow land, conventional landed electrode.

Therefore it is evident that tapered electrodes have advantages. Firstly the only possible limitation on feed rate is that imposed by the amperage available from the source of current supply for the process. Secondly the side or radial overcuts obtained are very much smaller for the same machining gap resulting in an increased accuracy of reproduction of form on the workpiece.

The main disadvantage of machining with tapered electrodes is that the final form cannot be taken right up to any shoulders on the desired final form of the workpiece.

The manufacture of tapered electrodes for use in the above methods such that each machining face or land of the tool is inclined at the same angle can be achieved as follows. As an example, the manufacture of:

(1) an electrode fo machining square bar with a keyway therein from round bar stock material, and
(2) An electrode for machining round bar with a keyway therein from square bar stock material.

is described as parallel discussion with reference to FIGS. 23A to 27A and 23B to 27B respectively.

The first stage is to machine the electrode with the chosen angle of taper, as shown at 140, for the tool with the cross-sectional form of the workpiece, i.e. a cone if the workpiece is a round bar (FIG. 23A), a rectangular pyramid if the workpiece material is square bar (FIG. 23B), or of course a tapered hexagon if the stock is hexagonal bar and so on.

Figure 24A:
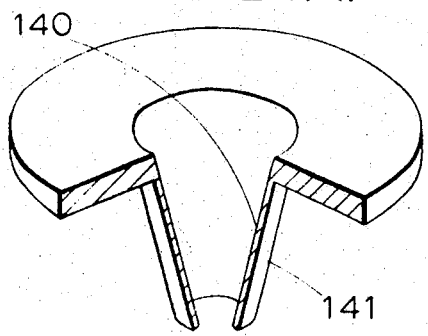
Figure 24B:
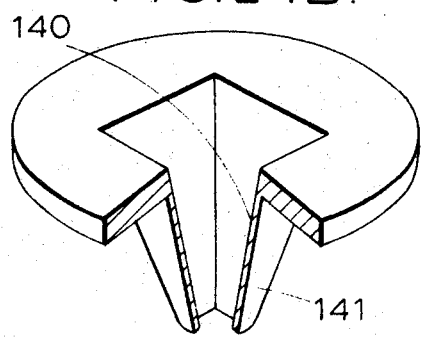
Figure 25A:
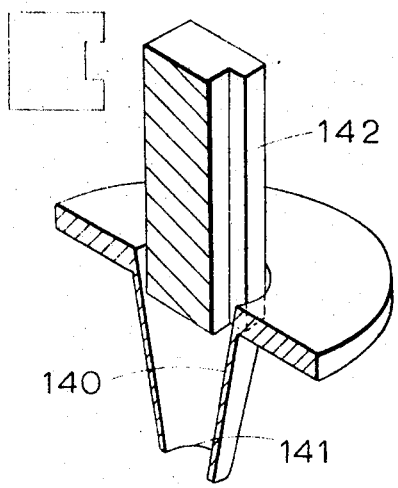
Figure 25B:
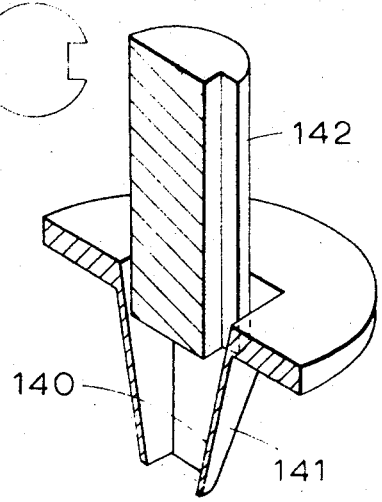

Next the wall thickness of the cone or pyramid is machined down to about 0.010"–0.020"—as shown at 141 in FIGS. 24A and 24B.

Next the required final form of the workpiece is then machined into this tapering shell with due allowance for the effects of electrochemical machining overcutting. The preferred procedure for this is to machine a bar of copper or some other suitable electric spark discharge machining electrode material to the required final form of the workpiece, with an allowance for the final overcut, and use this bar as an electrode to electric spark discharge machine the correct finish form into the tapered electrode as shown at 142 in FIGS. 25A and 25B.

Figure 26A:
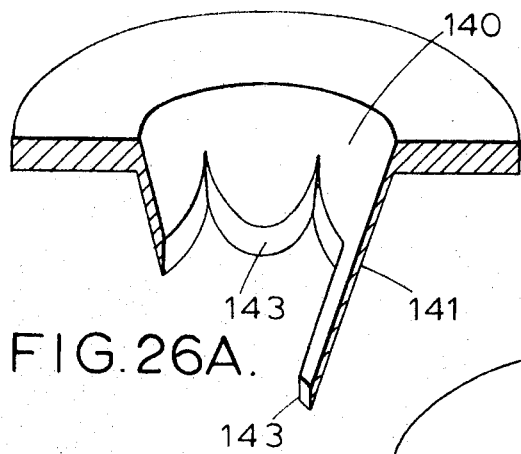
Figure 26B:
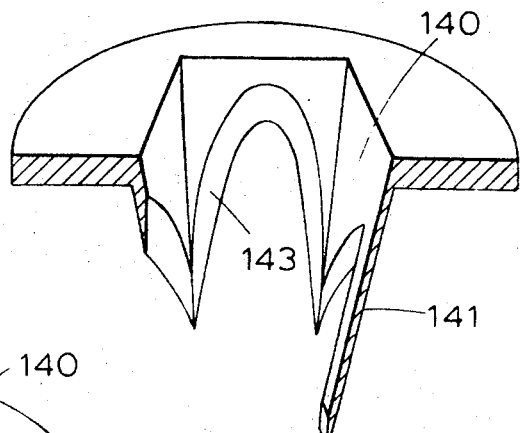
Figure 27A:
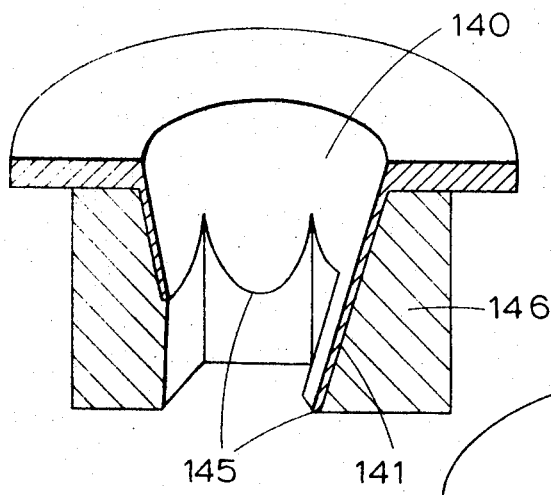
Figure 27B:
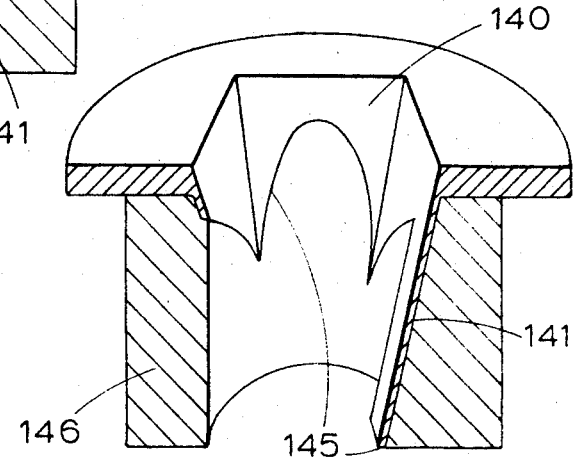

Next as shown at 143 in FIGS. 26A and 26B, the resulting electrode will have a vertical land face proportional to the thicknes of the tapering 'shell,' and to minimise side or radial overcut this vertical land is filed back horizontally around the contour as shown at 145 in FIGS. 27A and 27B.

Lastly, it is essential that the electrolyte should flow uniformly through the entire machining zone when the tool is in use with no areas starved from electrolyte. By reference to FIGS. 26A and 26B it is simple to visualize that the machining area in the electrode forming the keyway will be starved of electrolyte with the electrolyte taking the shorter flow paths out of those parts of the tool forming the body of the workpiece. It is essential therefore to have very nearly equal flow path lengths throughout the electrode and this is accomplished by extending the electrode in regions where little machining is required with areas of insulation as shown at 146 in FIGS. 27A and 27B. These areas of insulation 146 may be formed by casting an insulating epoxy-resin pot between formers around the tool.

If additional electrolyte supply to the machining zone is required, this may be best achieved by manufacturing the electrode from a previously sectioned blank so that the tool is made up from a series of slices. After the final form has been machined into the electrode with the slices together, the insertion of insulating spacers as shown typically at 147 in FIG. 21 between the sections or slices 148, each with electrolyte delivery or electrolyte exhaust channels will ensure the correct form of electrode with the electrode land surfaces being presented to the workpiece at a uniform angle.

Figure 28:
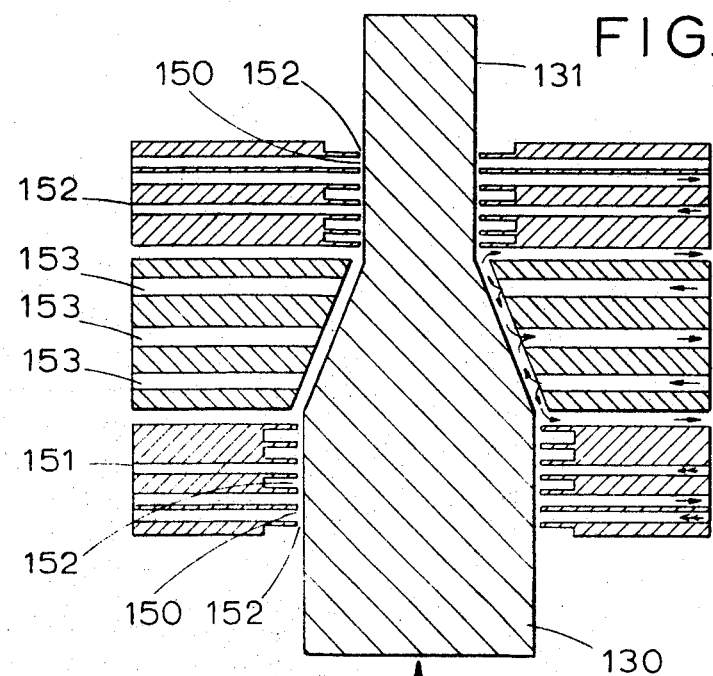

The design of tapered tooling if allowing for the supply and exhaust of electrolyte can make the conventional electrochemical machine tool machine unnecessary since the electrode has all the basic attributes of a normal workchamber. All that is required to be added to the tool of FIG. 21 to provide a working chamber is a method of sealing between the ends of the electrode and workpiece and means for carrying the electrolyte away for filtering and recirculating. This can readily be accomplished as shown in FIG. 28 by the use of an annular chamber 150 at each end of the electrode 151 which can be pressurised with air using labyrinth seals 152 to contain the electrolyte within the machining zone, electrolyte supply and extraction passages being shown at 153.

The invention has to a large degree been discussed in terms of the electrochemical machining of shafts and external forms but the technique of machining with tapered electrodes and the method of construction of the electrodes can be equally applied to the generation of internal forms.

Referring again to FIG. 1 a cathodic tool 1 is shown being used to produce a parallel sided hole 3, being fed downwards into the workpiece 2 with electrolyte being circulated through the machining area by way of a bore 4 within the tool 1, and leaving the machining area through the annular space 7 left between the tool and the hole 3. The working gap between the front or lower face of the tool 1 and the workpiece 2 is, it has been found, preferably constant under steady conditions and may therefore be referred to as the equilibrium gap and is given the reference $h_e$ in FIG. 1.

Figure 29:
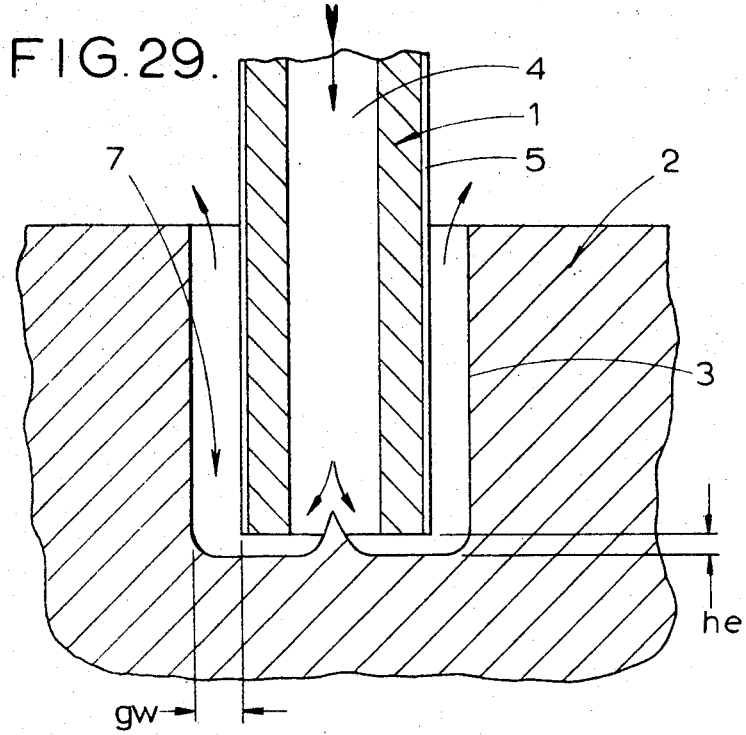

The arrangement shown in FIG. 29 is generally similar to that of FIG. 1 with the exception that the land 6 is omitted, and where features correspond to those of FIG. 1 they are given the same reference numerals.

It can be seen that in either the arrangement of FIG. 1, or the arrangement of FIG. 29, there will be a certain amount of radial overcut in the machining operation as opposed to stray machining producing a hole 3 of rather larger diameter then the actual diameter of the tool 1. In the arrangement of FIG. 1 it can be shown that the radial overcut $g_{w_1}$ is given by the relationship:

$$g_{w_1} = (2h_e w + (1.7 h_e)^2)^{1/2} \quad (1)$$

where $w$ is the width of the land 6
and for the arrangement of FIG. 29 it can be shown that, the radial overcut $g_{w_2}$ is given by the relationship:

$$g_{w_2} = 1.7 h_e \quad (2)$$

The tool electrode can be accurately manufactured to a given size and consequently it can be seen that the variation in actual size of the hole produced is predominantly dependent on the radial overcut produced during the machining operation which is as shown from Equations 1 and 2 dependent on the equilibrium gap $h_e$ in either instance.

The equilibrium gap $h_e$ can be shown to be given by the relationship:

$$h_e = \frac{E_w \times V \times K}{p \times F \times f} \quad (3)$$

where:
$E_w$ is the electrochemical equivalent of the workpiece material.
V is the voltage across the working gap,
$f$ is the linear feed rate of the electrode,
$p$ is the density of the workpiece,
K is the electrical conductivity of the electrolyte,
F is Faradays Constant.

It can be seen that $E_w$ and $p$ are constant for any given workpiece, and it can be arranged that $f$ is maintained at a constant linear feed rate quite readily. It therefore follows that the equilibrium gap $h_e$ is dependent on the two variables V and K and consequently the radial overcut and the accuracy of the hole produced are also dependent on these variables V and K.

In order to control the machining voltage which is provided from a high current capacity D.C. power supply derived from an A.C. mains supply, the D.C. power supply is stabilised to with ±1% of its output voltage, typically some 12 volts, regardless of mains supply voltage fluctuation which, in the United Kingdom, may be between +10% and −10%. However this alone is not sufficient as at the actual machining zone 213 (FIG. 30) the machining voltage between the cathodic tool and the anodic workpiece is dependent on a number of other factors such as increase in electrical resistance of tooling and current leads due to heating effects during the machining process. Also differences in surface contamination which introduce further variations in voltage in the actual machining zone 213 each time an electrode or workpiece is changed.

In this embodiment of the invention, this problem is overcome by providing voltage probes in the actual machining zone 213 which are maintained in good electrical contact one with the tool cathodic electrode and the other with the workpiece anodic electrode; and these voltage probes are connected to the D.C. power supply to provide a feed back of information to control that power supply in order to maintain the actual machining voltage in the machining zone, between the tool and the workpiece constant. This is illustrated schematically in FIG. 30 in which an annular tool electrode is used to reduce a workpiece in diameter or size by passing that workpiece through it to perform the machining operation. A high current capacity D.C. power pack 222 is provided to supply the machining voltage across the tool 220 and the workpiece 221, and the power pack 222 is arranged so that its output voltage is controlled in accordance with a signal sent into the power pack 222 from a differential amplifier 223.

A control voltage source in the form of a potentiometer 224 is provided by which the machine operator can establish a potential on the line 225 which is equal and opposite to that required to be present in the machining zone. The voltage on the line 225 is algebraically added to that on the line 226 which is connected to the voltage probe connected to the workpiece to give a composite signal on the line 227 which is fed into the differential amplifier 223. Line 228 is connected to the voltage probe in connection with the tool electrode and the voltage on this line is also fed to the differential amplifier 223 so that its output is indicative of whether the voltage in the machining zone is above or below that determined by the setting of the potentiometer 224, and this can control the power pack 222 appropriately. Thus it can be seen that the voltage in the machine zone can be maintained constant to a predetermined value.

The conductivity of the electrolyte is predominately proportional to the temperature of the electrolyte with increasing temperature resulting in increasing conductivity. It is possible to control the temperature of the electrolyte to a certain degree by incorporating heat exchangers in the electrolyte circulation system and providing thermostats to control the circulation of the electrolye through such heat exchangers in its passage to the machining zone, and with the maintainance of constant voltage in the machining zone as described above the equilibrium gap $h_e$ can thus be maintained substantially constant.

However due to the volume of electrolyte involved in the circulation system, and the irregular amount of heat input to the electrolyte resulting from intermittent machining it is not possible to maintain the temeprature, and thus the conductivity, of the electrolyte at the delivery to the machining zone 213 sufficiently constant to permit the highest required degree of machining accuracy.

Therefore in a modification of this last embodiment of the invention, the conductivity of the electrolyte is continually monitored at a point immediately prior to its entry into the machining zone, so that the voltage in the machining zone may be adjusted to compensate for varying conductivity of the electrolyte in the machining zone. FIG. 31 shows a schematic diagram of how this may be achieved and where parts are similar to those shown in FIG. 30 they are given the same reference numbers and no further description will be given.

The electrolyte is circulated from an electrolyte supply system (not shown) through a pipe 230 to the machining zone 213 between the tool 220 and the workpiece 221. Immediately prior to the point at which the electrolyte pipe 230 enters the machining zone, some of the electrolyte flow is tapped off along a line 229 passed through a cell 232 back to an electrolyte reservoir (not shown) along the line 233. The electrical conductivity of the electrolyte flowing through the cell 232 is measured by a conductivity meter 234 which gives an output signal on the line 235 in the form of a voltage directly proportional to the conductivity of the electrolyte. The signal on the line 235 is amplified by an amplifier 236 and algebraically added to the control voltage provided by the potentiometer 224 so that the signal on the line 225 is corrected in accordance with the conductivity of the electrolyte flowing into the machining zone.

Thus it can be seen that by the arrangement of FIG. 31, the product of the two factors of voltage in the machining zone and electrolyte conductivity can be maintained substantially constant and consequently the equilibrium gap $h_e$ may be maintained substantially constant at a desired value resulting in accurate control over the radial over-cut for a given tool with consequent accuracy of the hole produced.

Again it will be appreciated that the conductivity cell 232 need not be placed immediately before the machining area in the electrolyte circulation system, but can be placed at other points around the system, such as immediately after the machining area.

Another method by which the product of the electrolyte conductivity K and the applied voltage V can be maintained constant is by taking the voltage derived from the voltage probes and the voltage derived from the conductivity cell and multiplying the voltages together in analogue fashion within a multiplying amplifier, and using the product voltage to control the D.C. power supply of the voltage across the tool and workpiece. Again the product voltage produced by the multiplication can be compared with a pre-set reference voltage whereby an error signal may be produced with which to control the power supply.

A yet further aspect of the invention relates to electrochemical machining and particularly, but not exclusively, to electrochemical die sinking and like operations.

A considerable problem exists in the design of cathode electrode die sinking tools for use in present electrochemical machining processes to produce a required female shape in a workpiece such as a sheet metal forming or forging die, particularly when the desired finished machined shape in the workpiece is comparatively deep and includes surfaces which run nearly or actually parallel to the direction of feed of the cathode electrode tool into the workpiece. The problem arises in that while electrochemical machining takes place across the front face of the tool as the tool is fed into the workpiece, electrochemical machining also takes place between surfaces of the tool running parallel or nearly parallel to the direction of feed and such machining continues during the whole time of the mahining operation resulting in considerable over machining on such parallel or nearly parallel surfaces. Consequently in order to achieve a given machined shape in a workpiece during a die sinking operation, it has been necessary to make considerable and complex allowances on the shape and size of the machining surfaces on the cathode electrode tool to allow for such over machining which is similar in some respects to the stray machining discussed above, and this has not always proved either possible or satisfactory.

Figure 32:
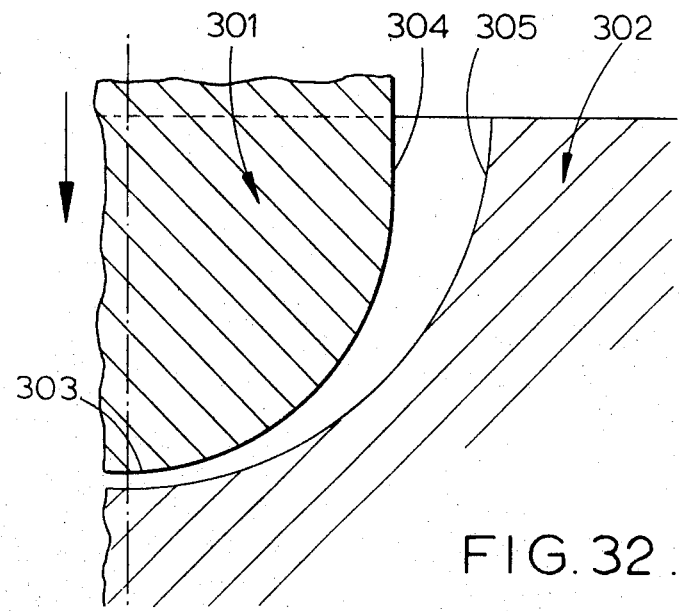

Referring first to FIG. 32 there is shown in schematic half cross-section a diagram of an electrochemical machining operation of a conventional type in which a tool indicated generally at 301 is being used to sink a hemispherically shaped recess into a workpiece indicated generally at 302.

The direction of feed is downwards as seen in FIG. 32 with electrolyte being circulated between the tool and the workpiece by means not shown, and it can be seen, therefore, that while electrochemical machining takes place at the front or bottom face 303 of the tool and progressively round the tool towards the side area indicated generally at 304 where the machining surface of the tool approaches the direction of feed of the tool into the workpiece, in order to sink a recess corresponding in shape to the tool 301; electrochemical machining will continuously take place around the side area 304 while the tool 301 is being fed into the desired depth resulting in considerable over machining around the side region 304 with the consequent production of a recess considerably different in size and shape to the tool 301, as indicated at 305. Thus it can be seen that to machine the form shown in the workpiece with a conventional technique it is necessary to make considerable allowances in the shape and size of the tool 301 as shown in the figure.

Figure 33:
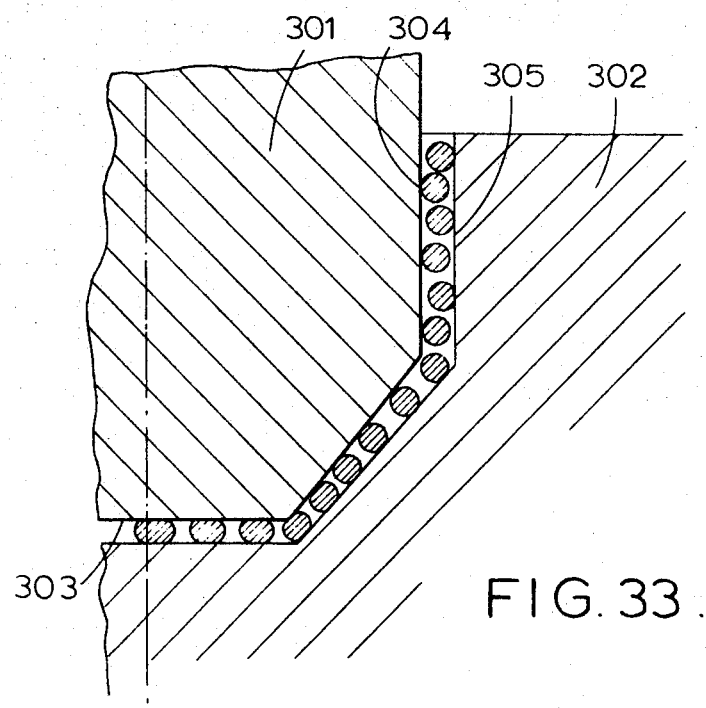

FIG. 33 shows in schematic diagrammatic form a half cross-sectional view of a machining operation generally similar to that of FIG. 32 in purpose, only utilising an embodiment of the invention. Where similar parts or items are referred to in FIGS. 32 and 33 they are given the same reference numbers.

In this embodiment of the invention the electrolyte is circulated between the tool 301 which corresponds in shape to the desired recess in the workpiece but which is dimensionally smaller than the recess over the whole machining surface by a small predetermined clearance, and the workpiece 302 in the form of stable globules of electrolyte formed and carried in a dielectric liquid. The dielectric liquid is chosen in relation to the electrolyte so that the globules of electrolyte when formed therein are stable and substantially equal in size. The actual size of the globules of electrolyte is carefully chosen and achieved to correspond with the predetermined clearance between the under size tool 301 and the required dimension of the recess in the workpiece 302 at the end of the machining operation.

It can be seen that when the electrode 301 is fed into the workpiece 302, if the gap between the workpiece 302 and the front face 303 of the tool is kept below the diameter of the electrolyte globules during feed of the tool 301, the globules are distorted and contact both the tool 301 and the workpiece 302 as they are circulated through the machining area in the dielectric liquid, and consequently electrochemical machining takes place. However in the area 304 of the tool 301 which presents a machining surface generally parallel to the direction of the feed of the tool, it can be seen that machining will take place until the gap between the area 304 and the opposite area 305 of the workpiece 302 becomes sufficient so that globules of electrolyte in that area can no longer contact both the tool 301 and the workpiece 302 and consequently electrochemical machining ceases in this area as no electrochemiacl current can flow. Thus it can be seen that in this embodiment of the invention when the tool 301 is fed into the workpiece 2 in a die sinking operation, and progressively fed down to a predetermined depth, electrochemical machining will cease all the way round the machining surface of the tool 301 once the gap between the tool 301 and the workpiece 302 at any given point exceeds the diameter of the electrolyte globules.

Excessive machining in the area 304 of the tool 301 is consequently eliminated and the design of the shape and size of the tool 301 is considerably simplified in that only a simple allowance in size corresponding to the chosen globule size of the electrolyte must be made over the whole machining surface of the tool 301. When the tool 301 has been fed down to a predetermined depth then the feed should be stopped but machining continued to permit machining in the area of 303 of the tool 301 to obtain the correct form of the workpiece 302.

Figure 34:
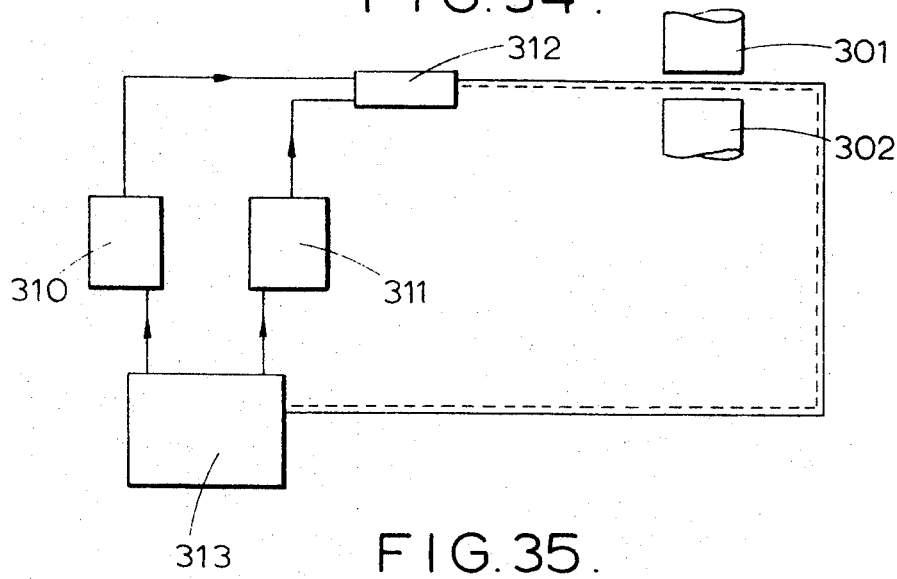

FIG. 34 shows one exemplary electrolyte and dielectric circulation system by which electrolyte may be circulated through the machining area between the tool and the workpiece 302 in the method depicted in FIG. 33.

The circulation system comprises a pump 310 for the dielectric liquid, and a pump 311 for the electrolyte the output of both these pumps being connected to apparatus for atomizing the electrolyte to form globules of electrolyte and mixing those globules with the dielectric liquid, this apparatus indicated generally at 312. The combined dielectric liquid and electrolyte globules then carry on through the machining area between the tool 301 and the workpiece 302 under the influence of the pumps 310 and 311 and back to apparatus indicated at 313 which separates the dielectric liquid and the electrolyte to supply each individually respectively to the pump 310 and 311.

Figure 35:
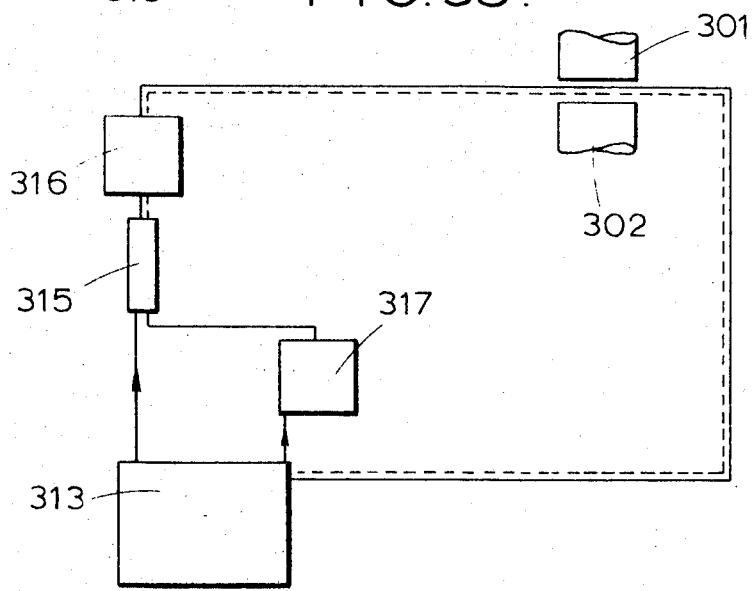

FIG. 35 shows an alternative electrolyte globule formation and dielectric circulation system, in which the electrolyte is injected in globule form into the stream of dielectric in apparatus indicated generally at 315 and the mixture of dielectric liquid and electrolyte globules is circulated through the machining area between the tool 301 and the workpiece 302 by means of a pump 316 and returned to apparatus indicated at 313 for the separation of the dielectric liquid and the electrolyte. A pump 317 is providel to circulate the actual electrolyte from the apparatus 313 to the point of injection within the apparatus 315.

In either of these methods of electrolyte injection, the physical conditions of the formation of the electrolyte globules and their injection into the dielectric stream are chosen to provide globules of a predetermined size for use in the machining technique of the invention as described above by way of example.

The formation of globules of electrolyte in the dielectric liquid may be accomplished in a number of ways and another alternative is to use emulsifying agents. The emulsifying agent is added to a mixture of electrolyte and dielectric and is agitated to produce a stable emulsion of electrolyte in the dielectric liquid the conditions of the mixture, and emulsion agents being chosen to produce a desired size of electrolyte globule. This emulsion would then be delivered to the machining zone between the tool and the workpiece by a high pressure pump in a manner similar to that with conventional electrolyte delivery in electrochemical machining.

FIG. 1 shows a, as discussed previously, schematic cross-sectional diagram of electrochemical hole boring operation. As discussed stray machining takes place in the area, indicated at 7, into which the electric field between the land 6 and the workpiece 2 in a conventional liquid electrolyte extends, resulting in considerable over machining in this area particularly in the production of deep holes. Such stray machining can be eliminated by the use of globule electrolyte in this embodiment of the invention in a similar manner to that described with reference to die sinking.

Again referring to FIG. 1, the electrode is insulated down its side to endeavour to restrict radical machining to that from the machining land 6. However under machining conditions such as small hole drilling with only narrow gaps between the insulation and the workpiece, the insulation is frequently stripped off and the exposed areas of electrode produce irregularly shaped holes. The adoption of globular electrolyte makes insulation of the electrodes unnecessary and the production of irreguularly shaped forms impossible.

Thus it can be seen that the invention in its several embodiments provides improvements in electrochemical machining techniques which result in enhanced quality and accuracy of work produced.

We claim:

1. In a method of electrochemical machining in which a cathodic tool is used to electrochemically machine an anodic workpiece with an electrolyte flowing through a machining area defined between the tool and the workpiece; the improvement comprising controlling the extent and shape of the electric field acting on the workpiece by the provision of a protective electrode immersed in said electrolyte and maintained at a positive electrical potential relative to said tool, said positive potential being different from that of said workpiece relative to said tool.

2. A method of electrochemical machining according to claim 1, wherein the protective electrode is maintained at a positive electrical potential higher than that of the workpiece relative to said tool.

3. A method of electrochemical machining according to claim 1, wherein the protective electrode is maintained at a positive electrical potential lower than that of the workpiece relative to said tool.

4. A method according to claim 1, wherein the tool and the workpiece are moved relative to one another.

5. A method according to claim 1, wherein the tool and the workpiece are maintained in a fixed position relative to one another.

6. In a method of electrochemical machining in which a cathodic tool is used to electrochemically machine an anodic workpiece with an electrolyte flowing through a machining area defined between the tool and the workpiece the improvement comprising controlling the voltage applied between said tool and said workpiece in accordance with the voltage produced between first and second probes in electrical contact with the tool and the workpiece in the machining area.

7. A method according to claim 6 and further comprising additionally controlling the voltage applied between said tool and said workpiece in accordance with the measurement of the electrical conductivity of the electrolyte immediately before the electrolyte flows into said machining area.

8. A method according to claim 6, further comprising producing a reference voltage, algebraically adding said reference voltage to the voltage on one of said probes, impressing the resultant algebraically summed potential onto a first input of a differential amplifier, impressing the voltage on the other of said probes onto a second input of said amplifier and utilizing the output from said amplifier to control the voltage between the tool and the workpiece.

9. A method according to claim 7, further comprising producing a reference voltage, algebraically adding said reference voltage to the voltage on one of said probes, impressing the resultant algebraically summed voltage onto a first input of a differential amplifier, impressing the voltage on the other of said probes onto a second input of said amplifier, and utilizing the output from said amplifier to control the voltage between the tool and the workpiece.

10. A method according to claim 9, further comprising algebraically adding the reference voltage to a voltage indicative of said conductivity, measurement prior to the algebraic addition with the voltage on said one probe.

11. A method according to claim 7, further comprising impressing first and second signals onto an electronic analog multiplying amplifier which produces an output representing the voltage analog of the product of said first and second signals, the first signal being the voltage established between the probes and the second signal being a voltage indicative of said conductivity measurement, and utilizing the output from said amplifier to control the voltage between the tool and the workpiece.

12. In a method of electrochemical machining in which a cathodic tool is used to electrochemically machine an anodic workpiece with an electrolyte flowing through a machining area defined between the tool and the workpiece; the improvement comprising controlling the voltage applied between said tool and said workpiece in accordance with the measurement of the electrical conductivity of the electrolyte immediately before the electrolyte flows into said machining area.

13. In a method of electrochemical machining in which a cathodic tool is used to electrochemically machine an anodic workpiece with an electrolyte flowing through a machining area defined between the tool and the workpiece and a desired form on the workpiece is produced relative to the movement between the tool and the workpiece; the improvement comprising providing a machining land on said tool which land is continuously tapered between a leading part and a lagging part thereof relative to the movement between the tool and the workpiece, the leading part of said land corresponding in cross-section to the initial form of the workpiece and the lagging part of said land corresponding in cross-section to the desired finishing form of the workpiece, and providing the machining land with at least one port and circulating the electrolyte between the land and the workpiece via said port.

14. In a method of electrochemically machining a shaped recess in an anodic workpiece in which a cathodic tool corresponding in shape but dimensionally smaller than the recess is used to electrochemically machine said workpiece with an electrolyte flowing through a machining area including a gap of predetermined width between the tool and the workpiece as the tool and workpiece are relatively moved; the improvement comprising forming the electrolyte from globules in a dielectric liquid, the globules having a diameter substantially equal to the predetermined width of said gap.

15. A method according to claim 14, further comprising atomizing said electrolyte to form the globules, mixing the atomized electrolyte with the dielectric liquid and circulating the mixture of dielectric liquid and globules through the machining area.

16. A method according to claim 14, further comprising injecting the electrolyte in globular form into said dielectric liquid and circulating the dielectric liquid and globules through the machining area.

17. A method according to claim 14, further comprising forming the electrolyte globules in the dielectric liquid by mixing the electrolyte, the dielectric liquid and an emulsifying agent.

18. A method according to claim 15, further comprising separating the globules of electrolyte from the dielectric liquid on exit from the machining area, re-atomizing the electrolyte so separated and mixing the re-atomized electrolyte with the dielectric liquid for the re-circulation through the machining area.

(References on following page)

References Cited

UNITED STATES PATENTS

| | | | |
|---|---|---|---|
| 2,996,602 | 8/1961 | Webb | 219—69 D |
| 3,051,638 | 8/1962 | Clifford et al. | 204—143 M |
| 3,271,281 | 9/1966 | Brown et al. | 204—224 X |
| 3,278,411 | 10/1966 | Williams | 204—143 M |
| 3,324,021 | 6/1967 | Haggerty | 204—224 |
| 3,453,192 | 7/1969 | Wilkinson | 204—228 |
| 3,523,876 | 8/1970 | Stark et al. | 204—284 X |
| 3,547,798 | 12/1970 | Haggerty | 204—224 |

FOREIGN PATENTS

| | | | |
|---|---|---|---|
| 419,764 | 11/1934 | Great Britain | 204—143 M |

JOHN H. MACK, Primary Examiner

D. R. VALENTINE, Assistant Examiner

U.S. Cl. X.R.

204—129.25, 129.55, 129.6 129.7, 225, 228, 231; 219—69 D, 69 E, 69 M